INVENTOR.
Robert E. Riley
James M Taub

United States Patent Office 3,740,340
Patented June 19, 1973

3,740,340
COMPOSITE INSULATORS FOR USE IN HOT
HYDROGEN ENVIRONMENTS
Robert E. Riley and James M. Taub, Los Alamos, N. Mex., assignors to the United States of America as represented by the United States Atomic Energy Commission
Filed Mar. 3, 1971, Ser. No. 83,572
Int. Cl. C09k 3/00
U.S. Cl. 252—301.1 R  9 Claims

ABSTRACT OF THE DISCLOSURE

Insulators comprising composites of the composition MC—M'O$_2$ where M and M' may be Ti, Zr, Hf, V, Nb, Ta, Th, and U, and the metal carbide content may readily range from approximately 25 to 75 volume percent, have low thermal conductivities and adequate structural properties when maintained at temperatures as high as 2300° C. for as long as 16 hours in a flowing hydrogen environment. The designation MC—M'O$_2$ is a general one and does not necessarily imply a stoichiometric monocarbide and/or dioxide.

BACKGROUND OF THE INVENTION

The invention described herein was made in the course of, or under, a contract with the U.S. Atomic Energy Commission. It relates to high temperature thermal insulators and more particularly to composite refractory metal carbide-transition and inner-transition metal oxide insulators suitable for use in a flowing hydrogen environment at temperatures in excess of 2000° C.

The best high temperature insulating material known is pyrolytic graphite; however, it will delaminate under cyclic temperature conditions and will volatilize in a hydrogen atmosphere at temperatures in excess of about 1000° C. Although refractory transition and inner-transition metal oxides have good insulating properties, at temperatures above 2000° C. they too are generally attacked by hydrogen. In fact, the literature discloses no insulating material that has been found to retain both its structural integrity and good insulating characteristics in a hydrogen environment at 2000° C. or higher for reasonably long periods of time. Henceforth, as used within this application the terms "insulating materials" or "insulators" refer to thermal insulators.

Work is being done to design a nuclear rocket reactor with an operating lifetime of ten hours or longer, and one that can be cycled to full operating temperature many times. Severe constraints are imposed on the present design by the fact that all currently used insulating materials are incapable of providing the necessary insulation for a ten-hour operating life if the temperatures to which the insulator is exposed exceed 1800° C. This means (1) that the reactor must operate below its optimum temperature, or (2) that cold hydrogen must be flowed over the insulating material to reduce its temperature, with such hydrogen flow resulting in a significant loss of specific impulse, or (3) that much thicker layers of insulation must be used with the resultant heavy weight penalty and hence reduction in payload.

As the operating temperature of the reactor is increased above 2000° C. the specific impulse goes up very rapidly as a function of temperature so that a substantial gain in payload is possible. An insulating material capable of withstanding temperatures in excess of 2000° C. in a flowing hydrogen environment is therefore extremely desirable.

SUMMARY OF THE INVENTION

We have now discovered that composite metal carbide-metal oxide materials of the composition MC—M'O$_2$ where M and M' may be Ti, Zr, Hf, V, Nb, Ta, Th, or U, and the metal carbide content may range from about 25 to 75 volume percent, have low thermal conductivities and adequate structural properties in a flowing hydrogen environment heated to 2000° C. and higher. As used within this application, the designation MC—M'O$_2$ is a general one and does not necessarily imply a stoichiometric monocarbide and/or dioxide. This is true also of any reference to a specific metal carbide or metal oxide as, e.g., ZrC and ZrO$_2$. These materials are thus highly suited for use as high temperature insulators in a hot hydrogen atmosphere. In particular, we have found that a nominal 25 vol. percent ZrC-75 vol. percent ZrO$_2$ composite has essentially the same thermal conductivity after 16 hours at 2300° C. in flowing hydrogen as it possesses after its initial exposure to that temperature. It is therefore an object of this invention to produce high temperature insulating materials. Another object is to produce high temperature insulating materials compatible with a hydrogen environment and exhibiting low thermal conductivities at temperatures in excess of 2000° C. Other objects of this invention will become apparent from the following description.

DESCRIPTION OF THE PREFERRED EMBODIMENTS

Figure 2:
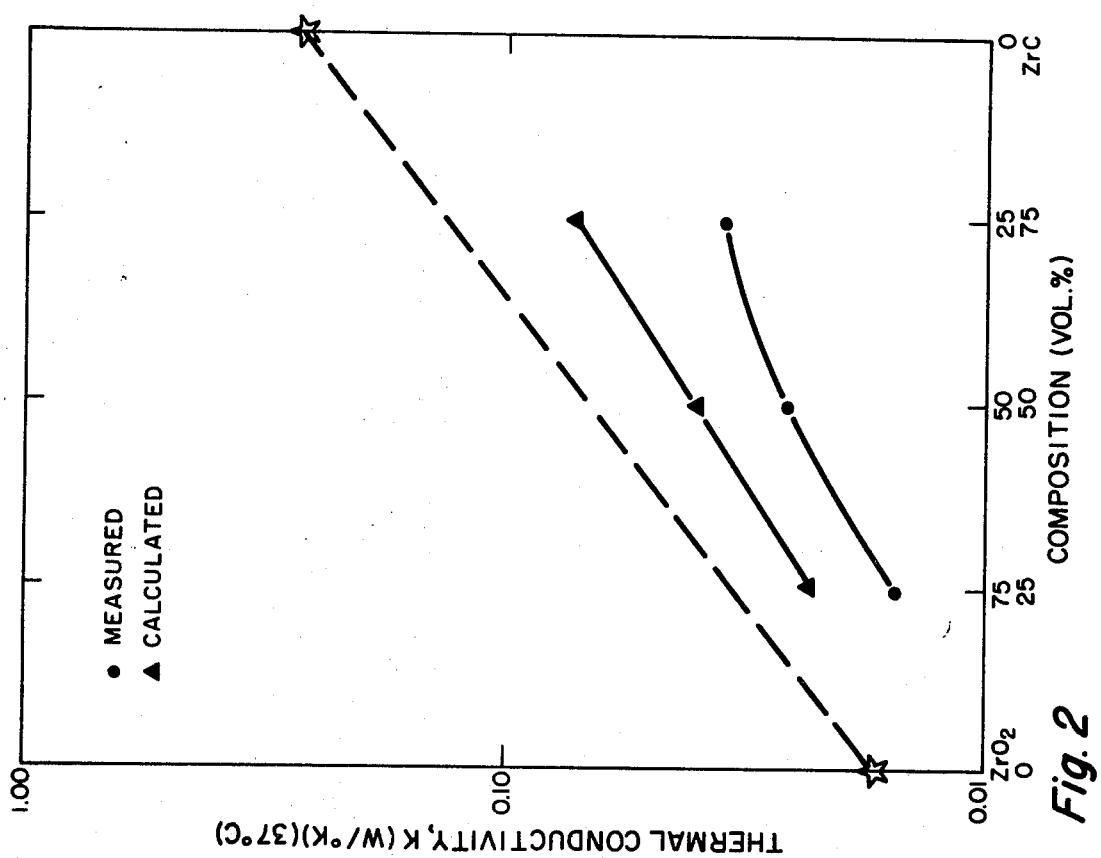
FIG. 2 shows the room temperature thermal conductivity of ZrC—ZrO$_2$ composites measured in the across-grain direction.

The metal carbide-metal oxide composites disclosed herein may be made by consolidating the carbide and oxide blended ingredients. Consolidation can involve such manufacturing techniques as cold press sinter, hot press, and cold or hot extrusion. These composites are readily produced by hot pressing a mechanical mixture of the carbide and oxide for one hour at 1800° C. in an argon atmosphere. Unless otherwise stated, all data presented within this specification relate to composites produced by this technique. Likewise, unless otherwise stated, all ZrO₂ is CaO stabilized. Again, all thermal conductivities are measured in the across-grain direction unless stated otherwise. Across grain means parallel to the pressing direction; with grain means perpendicular to the pressing direction.

Refractory metal carbides are generally capable of withstanding a hydrogen environment at temperatures of 2000° C. and higher for a considerable time; however, such carbides have thermal conductivities too high to make them useful as insulators at these temperatures. Refractory metal oxides, on the other hand, have relatively low thermal conductivities at these elevated temperatures but are generally susceptible to hydrogen attack. An effort was therefore made to ascertain if carbide-oxide composites could be made which would combine the insulating qualities of the oxide with the resistance to hydrogen attack of the carbide. While the literature discloses that solution of oxygen in a refractory carbide, e.g., UC, significantly lowers the thermal conductivity of the carbide, there is no indication that this information has heretofore been utilized to produce a high-temperature, hydrogen-resistant insulator. For that matter, on the basis of such information, it would not be apparent to one of reasonable skill in the art that refractory metal carbide-metal oxide composites are useful as insulating materials in very high temperature hydrogen environments.

Composites of ZrC—ZrO₂ were prepared by hot pressing ZrC and ZrO₂ powder mixtures at 1800° C. for about 10 minutes in an argon atmosphere. The pressings were made in the form of cylinders 1 inch in diameter by 1¼ inch in length. Thermal conductivity test specimens ¾ inch in diameter by ¼ inch thick were then machined from these pressings.

Thermal conductivity measurements were performed by making transient measurements and comparing with standards. Thermal conductivities measured at 37° C. for the various specimens are shown in Table I. Also indicated are the densities since thermal conductivity is a function of density as well as material—with the thermal conductivity decreasing with decreasing density. A limitation on lowering densities, however, is the effect this will have on desirable structural properties. The values measured for thermal conductivity were obtained in the direction parallel to the pressing direction, i.e., across grain. Measurements made at 20 and 30 seconds elapsed time gave identical results. Because the test specimens were only ¾ inch in diameter while the standards were 1 inch in diameter, size effects may account for thermal conductivity measurements that are slightly high. However, the specimens were wiped but not washed. Experience indicates that experimental values measured on dirty porous materials are lower than the true thermal conductivity values.

Figure 1:
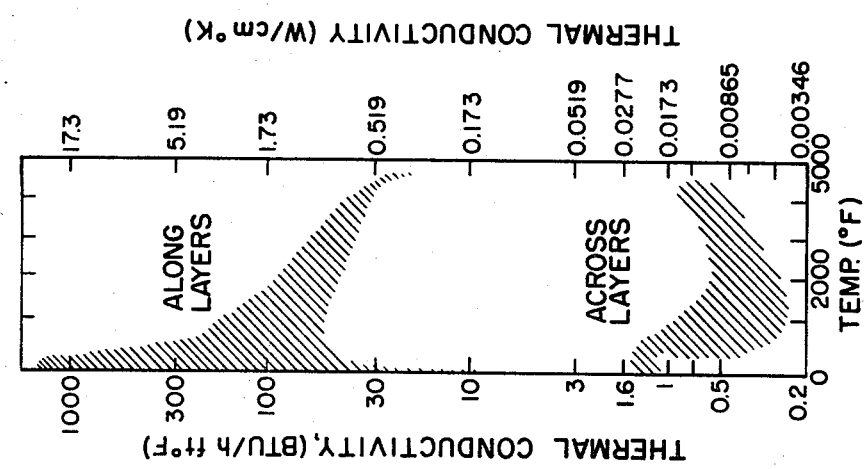
FIG. 1 shows the thermal conductivity of pyrolytic graphite as a function of temperature as taken from the literature.

As can be seen from Table I, ZrO₂ has a thermal conductivity much lower than that of ZrC. This fact is well known. What is unexpected, however, and could not have been reasonably foreseen, is that the ZrC—ZrO₂ composites listed all have thermal conductivities much closer to that of ZrO₂ than to that of ZrC. This is true even of the 75 vol. percent ZrC-25 vol. percent ZrO₂ composite. It should be noted that the 25 vol. percent ZrC-75 vol. percent ZrO₂ composite has a thermal conductivity comparable to that of pyrolytic graphite (see FIG. 1).

Figure 3:
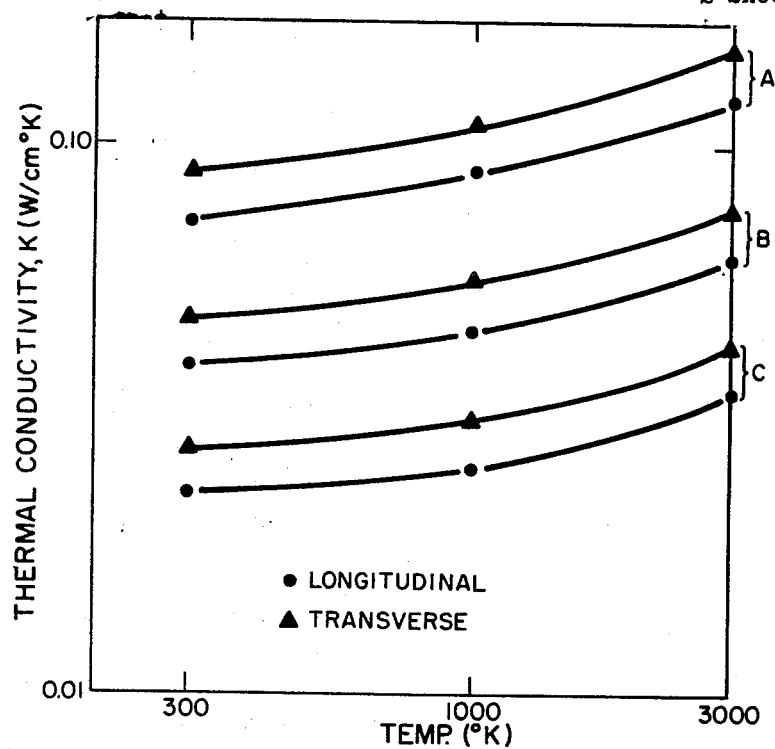
FIG. 3 is derived from estimates based on a semi-theoretical treatment (Bruggeman) of the variation of thermal conductivity with temperature for several ZrC—ZrO$_2$ composites.

FIG. 2 shows the measured and calculated values for thermal conductivity versus composition as compared with a linear extrapolation for the measured values of ZrO₂ and ZrC. The predicted values, which are based on a model which assumed spherical particles of ZrC dispersed in a continuous ZrO₂ matrix, are in reasonable agreement with the experimental data. Theoretical estimations of thermal conductivity as a function of temperature and composition based on the same model are presented in FIG. 3. In that figure, A is a nominal composition of 75 vol. percent ZrC-25 vol. percent ZrO₂ ($\rho$=5.33 g./cm.³), B is a nominal composition of 50 vol. percent ZrC-50 vol. percent ZrO₂ ($\rho$=5.15 g./cm.³), and C is a nominal composition of 25 vol. percent ZrC-75 vol. percent ZrO₂ ($\rho$=4.97 g./cm.³). All of these predictions assume the use of CaO-stabilized ZrO₂ and are based on values for the theoretically dense components. Any increase in void fraction, i.e., decrease in density, would decrease these conductivity values. It is apparent from these data that composition has very little effect on the room temperature comparative thermal conductivities of these ZrC—ZrO₂ composites.

Figure 4:
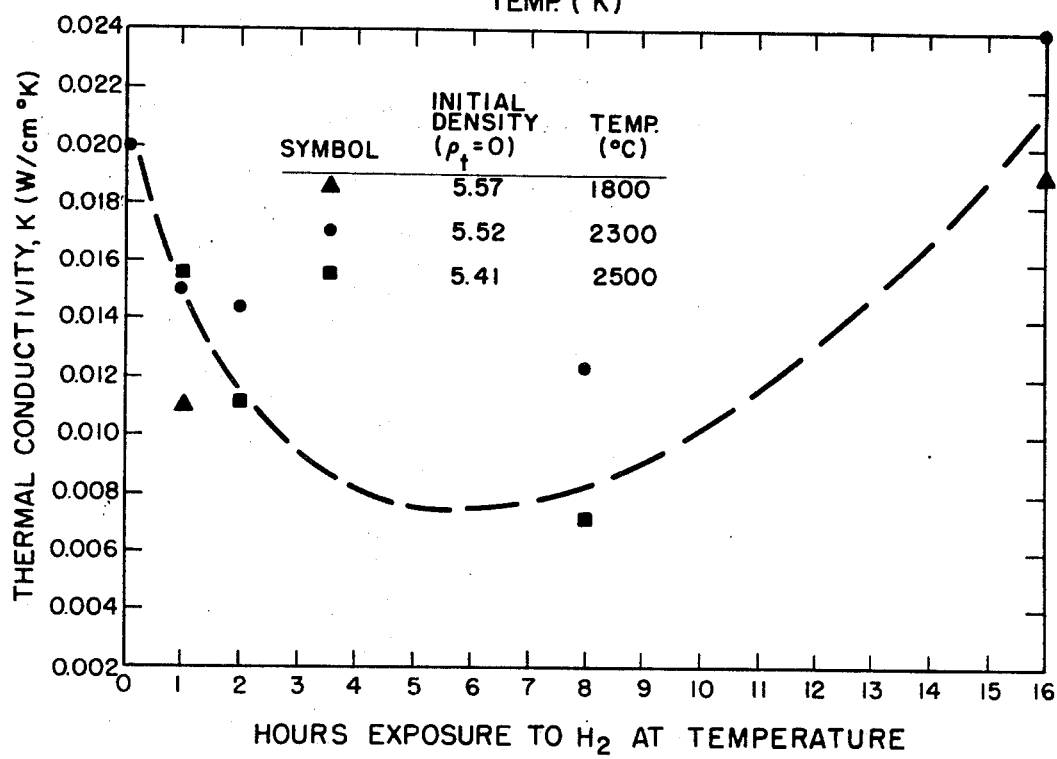
FIG. 4 shows the variation with time of thermal conductivity of a CaO-stabilized nominal 25 vol percent ZrC-75 vol. percent ZrO$_2$ composite on exposure to a hot flowing hydrogen atmosphere.

Wafers of a 25 vol. percent ZrC-75 vol. percent ZrO₂ composite about 1 inch in diameter by ¼ inch thick were made by hot pressing. Individual specimens were then exposed in flowing hydrogen at 1800, 2300, and 2500° C. for 0, 1, 2, 4, and 8 hours. Speciments were also given a 16-hour exposure at 1800 and 2300° C. Results of X-ray diffraction analyses and density and thermal conductivity measurements for these specimens are given in Table II. As used within Table II, "WC-strong" means that the composite showed evidence of considerable contamination from the tungsten crucible used to contain it. The variation of thermal conductivity with time at temperature is plotted in FIG. 4.

TABLE I.—THERMAL CONDUCTIVITY DATA FOR ZrC-ZrO₂ COMPOSITES

| Composition (nominal) | Room temperature density | | Thermal conductivity (w./cm. ° K.) at 37° C. |
|---|---|---|---|
| | G./cm.³ | Percent theoretical | |
| ZrO₂ | | | 0.017 |
| 75 vol. percent ZrO₂-25 vol. percent ZrC [1] | 4.970 | | 0.018-0.023 |
| 75 vol. percent ZrO₂-25 vol. percent ZrC [2] | 5.394 | 93.91 | 0.0155 |
| 50 vol. percent ZrO₂-50 vol. percent ZRC [2] | 5.487 | 90.24 | 0.026 |
| 25 vol. percent ZrO₂-75 vol. percent ZrC [2] | 5.362 | 9.60 | 0.035 |
| ZrC | | | 0.273 |
| Standards | | | |
| Lava (fired) | | | 0.0098 |
| Inconel 702 | | | 0.123 |
| Al₂O₃ (CRS-3) | | | 0.315 |
| BeO | | | 2.12 |

[1] CaO stabilized ZrO₂.
[2] Unstabilized ZrO₂.

TABLE II.—EFFECT OF TIME AT TEMPERATURE ON SELECTIVE PROPERTIES OF 75 VOL. PERCENT $ZrO_2$-25 VOL. PERCENT ZrC COMPOSITES

| Time at temperature | Property | Temperature (° C.) | | |
|---|---|---|---|---|
| | | 1,800 | 2,300 | 2,500 |
| As pressed | Cubic $ZrO_2$ (a.) | 5.123 | 5.123 | 5.120. |
| | Monoclinic ZrO | | | |
| | FCC [1]–ZrC (a.) | 4.683 | 4.698–4.686 | 4.698–4.686. |
| | Conductivity (w./cm. ° K.) | 0.022 | 0.020 | 0.022. |
| | Density (g./cm.³) | 5.57 | 5.52 | 5.41. |
| 1 hour | Cubic ZrO (a.) | 5.117 | 5.123 | 5.123. |
| | Monoclinic ZrO | | | |
| | FCC–ZrC (a.) | 4.698 | 4.662 | 4.656. |
| | Conductivity (w./cm. ° K.) | 0.011 | 0.015 | 0.0155. |
| | Density (g./mc.³) | | 5.29 | 5.123. |
| 2 hours | Cubic ZrO (a.) | 5.123 | 5.123 | 5.123. |
| | Monoclinic ZrO | | Trace | |
| | FCC–ZrC (a.) | 4.684 | 4.656–4.644 | 4.656. |
| | Conductivity (w./cm. ° K.) | | 0.0145 | 0.011. |
| | Density (g./cm.³) | | 5.20 | |
| 4 hours | Cubic $ZrO_2$ (a.) | 5.123 | 5.104 | 5.123. |
| | Monoclinic $ZrO_2$ | | Medium | Slight. |
| | FCC–ZrC (a.) | 4.686 | 4.650–4.632 | 4.650. |
| | Conductivity (w./cm. ° K.) | | 0.0198 | |
| | Density (g./cm.³) | | 5.09 | |
| 8 hours | Cubic $ZrO_2$ (a.) | 5.117 | 5.104 | [2]5.123. |
| | Monoclinic $ZrO_2$ | | Strong | |
| | FCC–ZrC (a.) | 4.683 | 4.638 | 4.686. |
| | Conductivity (w./cm. ° K.) | | 0.0124 | 0.0072. |
| | Density (g./cm.³) | | 5.24 | |
| 16 hours | Cubic $ZrO_2$ (a.) | 5.110 | 5.110 | |
| | Monoclinic $ZrO_2$ | Slight | Slight | |
| | FCC–ZrC (a.) | 4.638 | 4.650–4.638 | |
| | Conductivity (w./cm. ° K.) | | 0.024 | |
| | Density (g./cm.³) | | 5.26 | |

[1] Face centered cubic.
[2] WC-strong.

The decrease in conductivity with increased time at temperature through 8 hours at 2300° C. appears to be associated with (1) evidence of formation of monoclinic $ZrO_2$, (2) a decrease in the ZrC lattice parameter, and (3) a decrease in sample density. Beyond 8 hours at temperature the conductivity increases to about the same level as that of the as-pressed material. This increase in conductivity is also associated with an increase in density and a decrease in the amount of monoclinic $ZrO_2$ phase.

There was little change in the external appearance of the 1800° C. sample except that the 8- and 16-hour samples showed some evidence of a gold color. All samples exposed to 2300° C. showed a bright gold color; however, there was no evidence of melting and/or dimensional change. The samples run at 2500° C. exhibited increasing evidence of melting with increasing time. For this reason no samples were exposed beyond 8 hours at this temperature.

Metallographic results on the samples treated at 1800° C. gave evidence of structural change as shown by the presence of a white precipitate within the $ZrO_2$ grains. While there was no evidence of skin formation on these samples, those treated at 2300° C. did exhibit such an effect which generally increased with increased exposure time. The skin formed on the samples is believed to be a $ZrC_xO_y$ alloy. In addition to evidence of melting, all samples heated at 2500° C. showed the presence of what appears to be a precipitated needle-like phase in the $ZrO_2$ particles.

The influence of $ZrO_2$ particle size, type, and composition on the room temperature conductivity of ZrC-$ZrCO_2$ composites is shown in Table III. The carbide had a particle size of 3.5 $\mu$m. Both dense, fused, CaO-stabilized and porous, aggregate, unstabilized oxides were used. The stabilized oxide was divided into −80+150, −150+325, and −325 mesh fractions, with the −325 mesh fraction having an estimated average particle size of 35$\mu$m. The unstabilized oxide had a Fisher average particle size of 3.5 $\mu$m. It is apparent from the data of Table III that these composites have conductivities typical of a good insulator, and that oxide type, size, and composition have relatively little effect on the thermal conductivity of this class of materials.

TABLE III.—THERMAL CONDUCTIVITY OF SELECTIVE $ZrO_2$-ZrC COMPOSITES

| $ZrO_2$ mesh size | Composition | Room temp. density (g./cm.³) | Thermal conductivity (w./cm.°K.) at 37° C. |
|---|---|---|---|
| −80+150 | 75 vol. percent $ZrO_2$[1]—25 vol. percent ZrC | 4.92 | 0.0072 |
| −150+325 | 75 vol. percent $ZrO_2$[1]—25 vol. percent ZrC | 5.09 | 0.0101 |
| −325 | 75 vol. percent $ZrO_2$[1]—25 vol. percent ZrC | 5.18 | 0.0074 |
| | 75 vol. percent $ZrO_2$[1]—25 vol. percent ZrC | 4.80 | 0.0162 |
| | 75 vol. percent $ZrO_2$[2]—25 vol. percent ZrC | 4.96 | 0.0213 |
| | 50 vol. percent $ZrO_2$[1]—50 vol. percent ZrC | 4.88 | 0.0180 |
| | 50 vol. percent $ZrO_2$[2]—50 vol. percent ZrC | 4.97 | 0.0115 |
| | 75 vol. percent $ZrO_2$[2]—25 vol. percent ZrC | 4.75 | 0.0173 |
| | 25 vol. percent $ZrO_2$[2]—75 vol. percent ZrC | 4.89 | 0.0106 |

[1] CaO-stabilized.
[2] Unstabilized.

The primary mechanism contributing to the low conductivities of these composites is the reaction that takes place between the oxide and the carbide, with the resulting $MC_xO_y$ taking on the properties of the oxide which is an insulator. Table IV gives density, comparative thermal conductivity, and lattice parameters for ZrC samples hot presesd at 2200° C. in argon and heat treated as indicated, and to which had been added 0, 1, 2.5, 5, 10, and 15 wt. percent of an ultrafine $ZrO_2$. The conductivity data show a rather large effect due to heat treatment. The significant drop in conductivity for all samples heat treated for 4 hours at about 2300° C. in flowing hydrogen is believed to be due to the solution of oxygen in the ZrC lattice. This appears to be confirmed by the lattice parameter measurements. The sharp increase in conductivity after an additional 4 hours at about 2300° C. in flowing hydrogen is not understood.

Similar studies were conducted on NbC-$ZrO_2$ composites. Compositions, porosities, and comparative thermal conductivities at 50° C. for these composites are TABLE IV.—DENSITY, THERMAL CONDUCTIVITY AND LATTICE PARAMETERS OF ZrC-ZrO₂ COMPOSITES

| Composition | | Room temperature density (g./cm.³) | | | Thermal conductivity (w./cm.° K.) at 50° C. | | | Approximate lattice parameters of face centered cubic phase (A.) at 23° C. | | |
|---|---|---|---|---|---|---|---|---|---|---|
| Wt. percent ZrC | Wt. percent ZrO₂ | As-pressed | 4 hr. at 2,300° C. in H₂ | 4+4 hr. at 2,300° C. in H₂ | As-pressed | 4 hr. at 2,300° C. in H₂ | 4+4 hr. at 2,300° C. in H₂ | As-pressed | 4 hr. at 2,300° C. in H₂ | 4+4 hr. at 2,300° C. in H₂ |
| 100 | 0 | 6.08 | 6.06 | 6.05 | 0.119 | 0.060 | 0.092 | 4.697 | 4.692 | 4.677 |
| 99 | 1 | 5.91 | 5.88 | 5.83 | 0.116 | 0.063 | 0.066 | ¹4.698 | 4.697 | 4.684 |
| 97.5 | 2.5 | 5.50 | 5.46 | 5.49 | 0.0687 | 0.046 | 0.090 | 4.698 | 4.692 | 4.689 |
| 95 | 5 | 5.35 | 5.31 | 5.37 | 0.0663 | 0.042 | 0.060 | 4.698 | 4.693 | 4.676 |
| 90 | 10 | 5.69 | 5.67 | 5.69 | 0.0720 | 0.045 | 0.070 | 4.690 | 4.683 | 4.676 |
| 85 | 15 | 5.82 | 5.77 | 5.78 | 0.0670 | 0.027 | 0.072 | ²4.678 | 4.669 | 4.664 |

¹ Also detected two weak unidentified lines.
² Also detected weak phase of monoclinic ZrO₂.

shown in Table V. All specimens respond like very good insulators. Compatibility specimens heat treated for 8 and 16 hours at about 2300° C. in flowing hydrogen gave results similar to those obtained for the ZrC-ZrO₂ composites.

While both the NbC-ZrO₂ and TaC-ZrO₂ systems are comparable to the ZrC-ZrO₂ composite system with regard to insulating characteristics, they have no apparent advantages, and may concievably, when heat treated, oxidize to form, respectively, volatile $Nb_2O_5$ and $Ta_2O_5$.

The thermal conductivity of a number of other composite systems measured at 50° C. is given in Table VI. As can be seen, these composites are all good insulators. The conductivity is expected to remain nearly constant to about 1500° C. and then to increase with increasing temperature. The data with respect to the ZrC-UO₂ composites demonstrate the surprising fact that a mixture of these two components has a conductivity lower than that of either component at the appropriate density. (The thermal conductivity at 50° C. of the ZrC is about 0.19, and that of the UO₂ is about 0.07 w./cm. ° K.) Most startling, however, is the fact that increasing the proportion of the high conductivity phase (ZrC) decreases the conductivity of the mixture. Such a result is totally unexpected.

TABLE V.—EFFECT OF DENSITY AND COMPOSITION ON COMPARATIVE THERMAL CONDUCTIVITY OF ZrO₂-NbC COMPOSITES

| Composition | | | Thermal |
|---|---|---|---|
| Vol. percent NbC | Vol. percent ZrO₂ | Volume fraction of pores P | conductivity (w./cm.° K.) at 50° C. |
| 25 | 75 | 0.2218 | 0.0061 |
| 25 | 75 | 0.1700 | 0.0095 |
| 50 | 50 | 0.2370 | 0.0140 |
| 50 | 50 | 0.1480 | 0.0262 |
| 75 | 25 | 0.2240 | 0.0250 |
| 75 | 25 | 0.1560 | 0.0368 |

NOTE.—T.D.=ρ₀ g./cm.³=Theoretical density. 25 vol. percent NbC-75 vol. percent ZrO₂=6.13; 50 vol. percent NbC-50 vol. percent ZrO₂=6.69; 75 vol. percent NbC-25 vol. percent ZrO₂=7.25. Sample diameter~1"; ¼" thick.

TABLE VI.—THERMAL CONDUCTIVITY OF CERTAIN COMPOSITES AT 50° C.

| Composition (vol. percent) | | | | Conductivity (w./cm.° K.) | Room temperature density, ρ bulk* (g./cm.³) |
|---|---|---|---|---|---|
| UO₂ | HfO₂ | ZrC | HfC | | |
| 75 | | 25 | | 0.0358 | 7.59 |
| 50 | | 50 | | 0.0297 | 6.70 |
| 75 | | | 25 | 0.029 | 8.13 |
| 50 | | | 50 | 0.030 | 8.60 |
| | 75 | | 25 | 0.0410 | 8.14 |
| | 50 | | 50 | 0.0288 | 8.14 |

*Apparent bulk density as computed from weight and dimensional measurements. These values are a little below the true density values.

In certain very high temperature applications, as for example insulators in nuclear propulsion reactors, it is essential that these composites retain their structural integrity for at least a number of hours. The following systems show no indication of melting after being held at the indicated temperature for the length of time indicated.

| System | Temp. (° C.) | Time (hr.) |
|---|---|---|
| HfC-HfO₂ | 2,600 | 8 |
| HfC-UO₂ | 2,500 | 4 |
| NbC-ZrO₂ | 2,300 | 8 |
| ZrC-ZrO₂ | 2,300 | 16 |

The HfC-HfO₂ system is of particular interest because of its very high temperature compatibility (i.e., lack of any indication of melting). This compatibility has been found to hold where the amount of HfC ranges from about 50 to 75 vol. percent.

Although no experimental data have been obtained concerning the use of titanium, vanadium, and thorium, it is believed that these metals will also readily form good insulating composites. This belief is based on the fact that a monocarbide of each of these metals is isomorphous with at least one of the metal carbides for which experimental data have been obtained, that each forms a carbide having a high melting point, and that oxygen is known to be soluble in the carbide of each. Because of the volatility of TiO₂, it would be undesirable, however, to form composites utilizing this oxide.

The basis for the excellent insulating characteristics of the carbide-oxide composites herein disclosed is the formation of an oxycarbide having the general formula MM'C$_x$O$_y$ where M and M' may be selected from the group consisting of Ti, Zr, Hf, V, Nb, Ta, Th, and U. In the quaternary system of these elemental constituents, a wide range of solubilities is possible. However, the exact limits have not been determined.

Alternatively, the oxycarbide may be formed in a ternary system in which the oxygen and carbon are introduced as the oxide and carbide of the same metal. In such ternary systems a range of solubilities is also possible. With the exception of zirconium oxycarbide, however, the solubilities are not known. The literature discloses that in the zirconium-carbon-oxygen ternary system at 1800° C. a phase field designated as zirconium oxycarbide (ZrC$_x$O$_y$) exists. The empirical formula of the ZrC$_x$O$_y$ exhibiting the highest oxygen content is approximately $ZrC_{0.70}O_{0.15}$. The highest reported carbon content is shown by the empirical formula $ZrC_{0.92}O_{0.06}$.

It will be apparent to one of reasonable skill in the art that what has been disclosed is a series of refractory metal carbide-refractory metal oxide composites suitable for use as insulators in hydrogen environments at temperatures in excess of 2000° C. It will be further apparent that the number of such composites is not limited to those actually disclosed by example herein but rather is given by the general formula MC—M'O₂ where M and M' may be Ti, Zr, Hf, V, Nb, Ta, Th, or U. One of such skill will also realize that the volume percentages of the components are not limited to those given by example herein but may vary from essentially the oxide to essentially the carbide, depending on the properties desired. Finally, it will be apparent that the structural life of these composites is greatly extended if they are used in inert rather than hydrogen atmospheres, or at temperatures less than 2000° C.

What we claim is:

1. A high-temperature thermal insulator of the general formula $x$MC—$(100-x)$M′O$_2$ where $x$ is about 25 to 75 volume percent and M and M′ are metals selected from the class consisting of Ti, Zr, Hf, V, Nb, Ta, Th, and U, which exhibits low thermal conductivities and retains its structural integrity in a flowing hot hydrogen environment.

2. The insulator of claim 1 wherein M and M′ are Hf and $x$ is about 50 to 75 volume percent.

3. The insulator of claim 1 wherein M′ is Zr.

4. The insulator of claim 3 wherein M is Ta.

5. The insulator of claim 3 wherein M is Nb.

6. The insulator of claim 3 wherein M is U.

7. A high-temperature composite insulator of the formula $x$ZrC—$(100-x)$ZrO$_2$ wherein $x$ is in the range of about 25 to 99 volume percent, which exhibits low thermal conductivities and retains its structural integrity in a flowing hot hydrogen environment.

8. The insulator of claim 7 wherein $x$ is 25 volume percent.

9. A high-temperature insulator of the general formula ZrC$_x$O$_y$ where $x$ is in the range of about 0.70 to 0.92 and $y$ is in the range of about 0.06 to 0.15, which exhibits low thermal conductivities and retains its structural integrity in a flowing hot hydrogen environment.

References Cited

UNITED STATES PATENTS

| | | | |
|---|---|---|---|
| 3,370,942 | 2/1968 | Inoue | 106—43 X |
| 3,419,415 | 12/1968 | Dittrich | 106—43 X |
| 3,472,709 | 10/1969 | Quatinetz et al. | 106—43 X |

STEPHEN J. LECHERT, JR., Primary Examiner

U.S. Cl. X.R.

252—62; 106—43, 55, 56, 57, 65; 23—203 R